United States Patent [19]

Gevers

[11] 4,423,884

[45] Jan. 3, 1984

[54] BOOSTER AXLE CONNECTION SYSTEM FOR A TRAILER ASSEMBLY

[75] Inventor: David E. Gevers, Lafayette, Ind.

[73] Assignee: Talbert Manufacturing, Inc., Rensselaer, Ind.

[21] Appl. No.: 337,864

[22] Filed: Jan. 7, 1982

[51] Int. Cl.³ .............................................. B62D 53/04
[52] U.S. Cl. .............................. 280/405 A; 280/80 R; 280/81 R; 280/677
[58] Field of Search ............... 280/405 A, 405 R, 104, 280/676, 677, 682, 80 R, 80 A, 80 B, 81 R; 180/23

[56] References Cited

U.S. PATENT DOCUMENTS

| | | | |
|---|---|---|---|
| 2,446,205 | 8/1948 | Wickersham et al. | 280/81 R |
| 2,741,489 | 4/1956 | Bigge | 280/405 A |
| 2,772,892 | 12/1956 | Hake et al. | 280/405 A |
| 2,919,928 | 1/1960 | Haffer | 280/677 |
| 4,111,450 | 9/1978 | Pinto | 280/405 A |

Primary Examiner—Joseph F. Peters, Jr.
Assistant Examiner—Donn McGiehan
Attorney, Agent, or Firm—John R. Nesbitt

[57] ABSTRACT

A trailer assembly comprises a main frame, main axles carrying laterally spaced wheels for supporting the main frame, a suspension system connecting the main axles to the main frame, a kingpin for coupling the main frame to a power unit, a secondary frame, one or more booster axles carrying wheels for supporting the secondary frame, a suspension system connecting the booster axle or axles to the secondary frame, and a booster axle connection system between the main frame and secondary frame for proportionately distributing weight or force between the main axles to the one or more booster axles. The booster axle connection system includes a lever arm extending forward from the secondary frame, a support arm extending rearward from the main frame, and a variably positionable pivot connection between the support arm and the lever arm providing a fulcrum for movement of the lever arm. The fulcrum of the lever arm may be varied in relation to the number of booster axles to proportion the weight distribution between the main axles and the one or more booster axles. The secondary frame is sectioned to allow addition or deletion of booster axles. Connections between the support arm and the rear of the main frame and between the lever arm and the secondary frame allow the use of secondary frame sections in various combinations with the lever arm and main frame.

12 Claims, 18 Drawing Figures

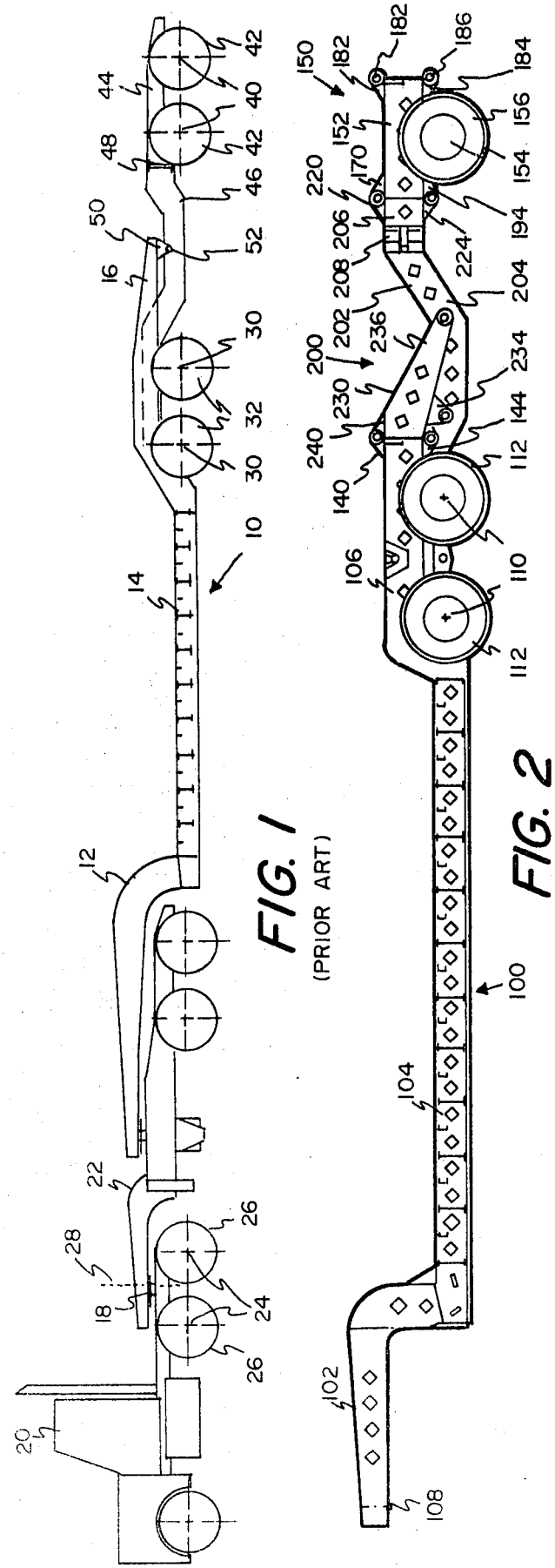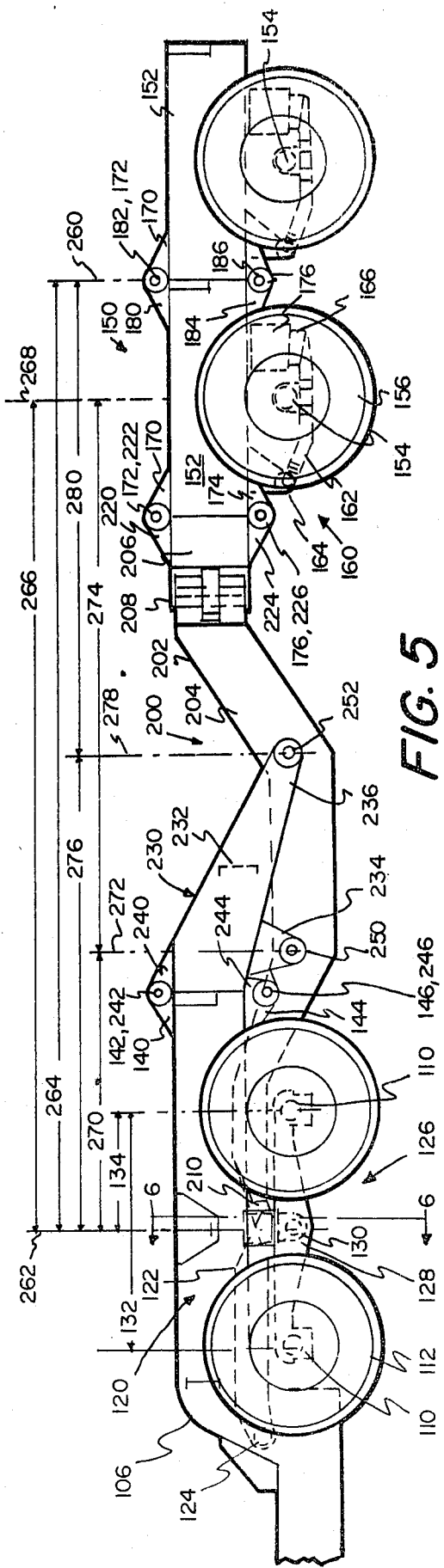

BOOSTER AXLE CONNECTION SYSTEM FOR A TRAILER ASSEMBLY

The present invention relates to trailer assemblies for transporting large heavy loads, and more particularly to improvements in connections between auxiliary frame and axle assemblies and the main frame of the trailer for distribution of weight from the axles supporting the main frame to one or more booster or auxiliary axles.

Special trailer assemblies have been developed for transporting large heavy loads from one location to another. In general, these trailer assemblies include a main frame for carrying the load, a kingpin for attaching the main frame to a power unit, and tandem rear axles carrying wheels for supporting the rear of the main frame. Generally speaking, it is desirable to distribute the weight of the load between the rear axle or axles of the power unit and the tandem axles at the rear of the trailer. However, in some instances, further distribution of the weight of the load is needed. In these instances, one or more booster axles are coupled to the rear of the trailer to partially distribute some of the load from the tandem axles at the rear of the trailer to the booster axle or axles. Heretofore, the connection between the main frame and the booster axle or axles has included a booster beam and a pivot joint beneath the rear of the main frame pivotally connecting the main frame to the booster beam. Once a trailer was built for a particular number of booster axles no other combination of booster axles could be used. Furthermore, removal of the booster axle or axles required disassembly of that booster beam aft of the booster beam pivot so that the pivot assembly remains as part of the trailer. In some configurations this pivot assembly requires an unuseable protrusion of considerable length over the rear of the trailer.

It is therefore one object of the present invention to provide a booster axle connection which allows the pivotal connection between the main frame and the booster beam to be variably positioned in relation to the number of booster axles being connected to the main frame.

Another object of the present invention is to provide a booster axle connection where various combinations of booster axles can be used without disconnecting the booster beam.

Yet another object of the present invention is to provide a booster axle connection where the fulcrum of the booster beam can be changed in proportion to the ratio of the number of booster axles being used to the two axles at the rear of the main frame in order to provide different weight distribution relationships between the tandem axles at the rear of the main frame and the booster axle or axles.

Still another object of the present invention is to provide connections between the booster beam, main frame, and secondary frame sections supported by booster axles which are easy to connect and disconnect and which further allow pivotal movement of a booster pivot arm relative to the main frame, and pivotal movement of the secondary frame sections relative to each other.

These objects are achieved in a trailer assembly comprising a main frame, tandem axles carrying wheels for supporting the rear of the main frame, a first suspension system connecting the tandem axles to the main frame, a kingpin for coupling the main frame to a power unit, a secondary frame section, a booster axle carrying wheels for supporting the secondary frame section, a second suspension system for connecting the booster axle to the secondary frame section, a lever arm providing a connection between the secondary frame section and the suspension system for the tandem axles, and a support arm extending rearwardly from the main frame and providing a pivot connection between the main frame and the lever arm which is variably positionable to change the fulcrum of the lever arm in relation to the ratio of the number of booster axles to the tandem axles to proportionately distribute the weight of the load between the tandem axles and one or more booster axles.

Other features and advantages of the present invention will become apparent in view of the following detailed description of one embodiment thereof exemplifying the best mode of carrying out the invention as presently perceived, which description should be considered in conjunction with the accompanying drawings. In the drawings:

FIG. 1 is a diagrammatic illustration of a trailer assembly showing a booster axle connection constructed according to the prior art;

FIG. 2 is a side elevational view of a trailer assembly including connections constructed according to the present invention;

FIG. 5 is an enlarged side elevational view of a section of the trailer assembly shown in FIG. 2 showing the use of more than one booster axle and showing the relationship between the variably positionable fulcrum point of the booster beam and the number of booster axles;

Figure 9A:
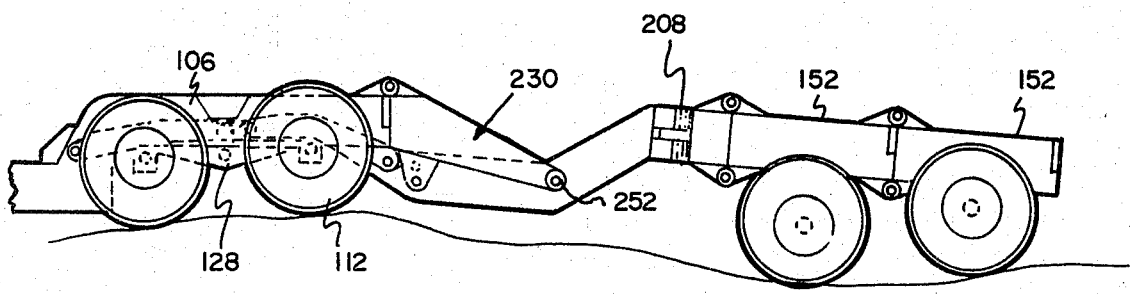
Figure 9B:
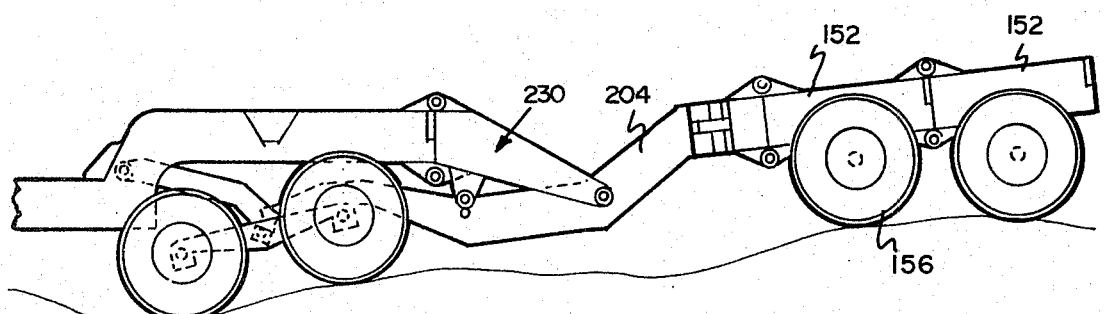
Figure 9C:
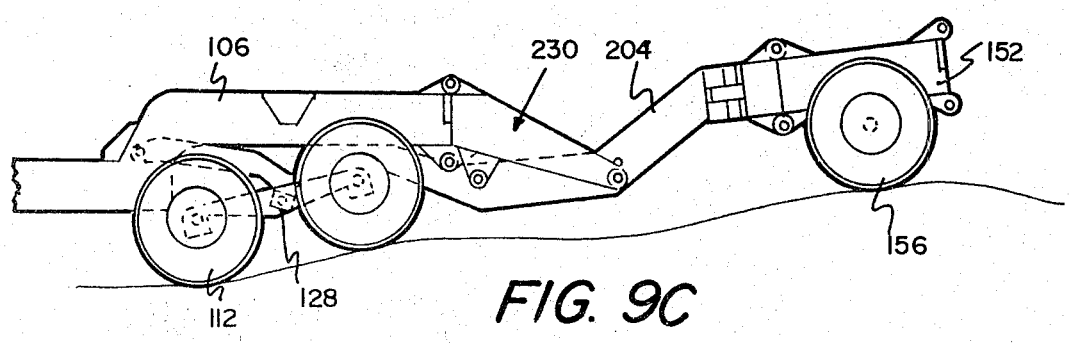

FIGS. 9a, 9b, and 9c are a series of three drawings showing various modes of operation of the trailer assemblies shown in FIGS. 2-5; and FIGS. 10a, 10b, 10c, 10d, and 10e are a series of drawings showing the interchangeable and versatile use of the secondary frame sections and connection means constructed according to the present invention with the booster beam and booster pivot arm removed from the main frame.

The present invention is particularly applicable to trailer assemblies having a configuration of the type shown in FIG. 1 for transporting large heavy loads. However, it is not intended that the present invention be limited to the exact trailer assembly configuration shown in FIG. 2. A booster axle connection system constructed according to the present invention may be adapted to other trailer assembly configurations without departing from the scope of the invention described herein.

Referring to FIG. 1, a conventional trailer assembly includes a main frame 10 having a front section 12, an intermediate section 14, and a rear section 16. The front section 12 includes a kingpin (not shown) which engages a fifth wheel 18 on a power unit 20, such as, for example, a truck. In some conventional trailer assemblies, an auxiliary trailer 22 is interconnected between the power unit 20 and the trailer assembly main frame 10. Tandem axles 24 carrying wheels 26 support the rear of the power unit 20. Sometimes this is true. However, the kingpin is frequently located slighly ahead of centerline of the tandem to load the first axle of the tractor with some of the payload.

The rear section 16 of the main frame 10 is supported by tandem axles 30 carrying wheels 32. This construction can also use three axles. Typically, the axles 30 are connected to the main frame 10 by a suspension system (not shown). When a load is positioned on the main frame 10, its weight is distributed between the tandem axles 24 of the power unit 20 and the tandem axles 30 of the main frame 10.

With exceptionally heavy loads, it is desirable to further distribute the weight between the tandem axles 30 and one or more booster axles 40. These booster axles 40 carry wheels 42 and support a seconary or auxiliary frame 44 which is connected to the main frame 10. The conventional connection between the main frame 10 and the secondary frame 44 inclues a booster beam 46 which is pivotally connected at point 48 to the secondary frame 44 and a booster pivot arm 50 extending downwardly from the rear section 16 of the main frame 10 to provide a pivot cnnection at point 52 between the booster beam 46 and the booster pivot arm 50.

The conventional pivot arm 50 and pivot connection 52 arrangement and the combination thereof with the auxiliary frame structure 44 supported by the booster axles 40 have severely limited the versatility of the prior trailer assemblies and have further prevented changing the location of the pivot connection of the booster beam in relation to the rear section 16 of the main frame 10 to proportionately distribute the weight of the load between the tandem axles 30 at the rear section 16 of the main frame 10 and the one or more booster axles 40.

Figure 3A:
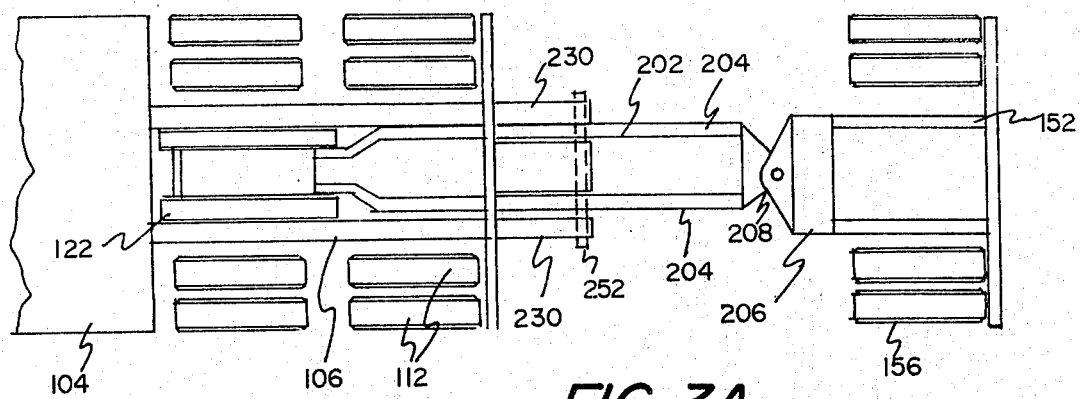
FIGS. 3a and 3b are top elevational views of the tailer assembly and connections shown in FIG. 2 showing the relationship of various elements of the assembly and connections.
Figure 3B:
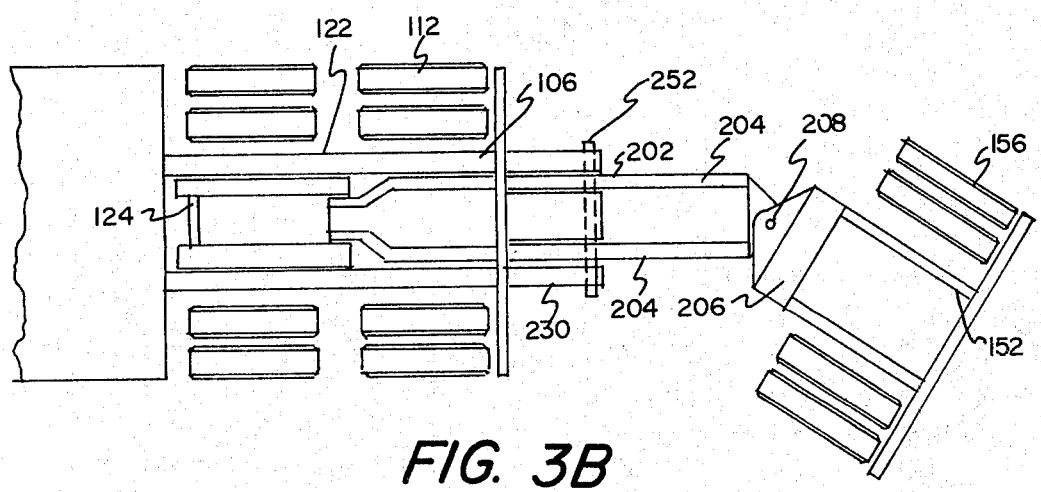
Figure 4:
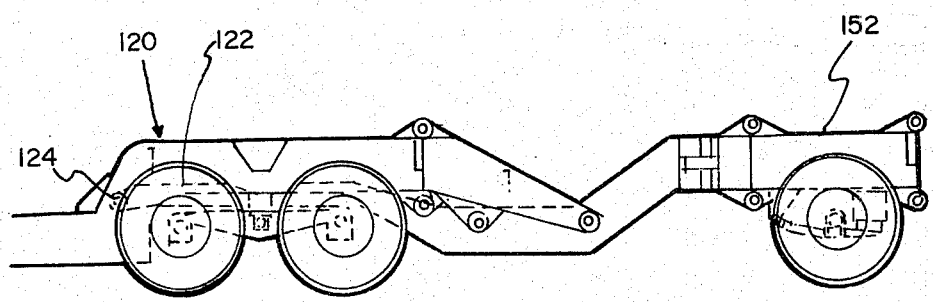
FIG. 4 is a side elevational view of a section of the trailer assembly shown in FIG. 2, including phantom lines showing the relationship of the various elements of the suspension systems and the booster axle connection.
Figure 6:
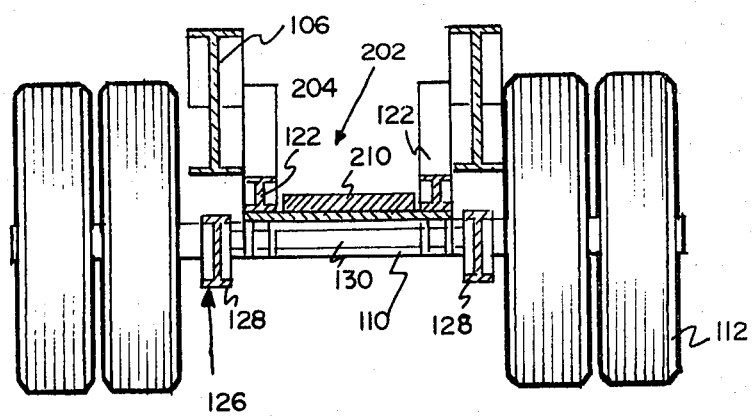
FIG. 6 is a cross-sectional view of the trailer assembly shown in FIGS. 2-5 taken generally along section lines 6—6 in FIG. 5.

Referring now to FIGS. 2-8, a trailer assembly constructed according to the present invention includes a main frame 100 including a front section 102 having a gooseneck configuration, an elongated flat intermediate section 104, and an elevated flat rear section 106. A kingpin 108 extends downwardly from the front section 102 and is provided for coupling the main frame 100 to a fifth wheel (not shown) of a power unit (not shown). The rear section 106 of the main frame 100 is supported by tandem axles 110, or three axles can be used, each rotatably carrying four (but not limited to four) laterally spaced wheels 112, as best shown in FIGS. 3a and 3b. The axles 110 are connected to the main frame 100 by a suspension system 120, as best shown in FIGS. 4 and 5. The suspension system 120 includes a trailing arm 122 pivotally connected to the main frame 100 at point 124. The distal end of the trailing arm 122 is movable vertically upward and downward relative to the rear section 106 of the main frame 100. The suspension system 120 further includes a walk beam 126 having laterally spaced-apart arms 128 which extend forwardly and rearwardly and are connected to the axles 110. Walk beam 126 is pivotally connected to the trailing arm 122 at a point 130 which is centrally located relative to the ends of the arm 128. Thus, vertical movement of one of the axles 110 causes a corresponding vertical movement in an opposite direction of the other axle 110. In the preferred embodiment, the axles 110 are longitudinally spaced apart a distance 132, as shown in FIG. 5, of 54 inches (137.16 cm). The pivot point 130 is located an equal distance 134 of 27 inches (68.58) cm from either axle 110.

Referring particularly to FIG. 2, the following are typical dimensions for the main frame 100. The total length of the main frame 110, including the front section 102, intermediate section 104, and rear section 106, is approximately 41.58 feet (12.67 meters). The front section 102 is approximately 9.75 feet (2.97 meters) in length, the intermediate section 104 is approximately 22.75 feet (6.93 meters) in length, and the rear section 106 is approximately 9.08 feet (2.77 meters) in length.

Referring to FIG. 5, the rear section 106 of the main frane 100 includes a pair of laterally spaced upwardly projecting connection flanges 140, each including an opening 142 and a pair of laterally spaced downwardly projecting flanges 144, each including an opening 146. As will be explained later, flanges 140 and 144 provide means for connecting either auxiliary frame sections or a booster axle connection system according to the present invention to the main frame 100.

Continuing to refer to FIGS. 2-8, a booster axle assembly 150 includes at least one secondary or auxiliary frame section 152, at least one auxiliary or booster axle 154 rotatably carrying four laterally spaced wheels 156, as shown in FIGS. 3a and 3b, for supporting the secondary frame section 152, and a suspension system 160 connecting the axle 154 to the secondary frame section 152. The suspension system 160 includes a trailing arm 162 pivotally connected to the secondary frame section 152 at point 164 and an air bag 166 interconnecting the distal end of the trailing arm 162 and the secondary frame section 152. The secondary frame section 152 includes a first pair of upwardly projecting connection flanges 170, each including an opening 172 and a first pair of downwardly projecting flanges 174, each including opening 176. The secondary frame section 152 also includes a second pair of upwardly projecting flanges 180, each including an opening 182 and a second pair of downwardly projecting flanges 184, each including an opening 186.

Means 200 for connecting the secondary frame section 152 to the main frame 100 includes a booster beam or lever arm 202 having an elongated front section 204 and a relatively short rear section 206. The front and rear sections 204 and 206, respectively, are pivotally connected at 208 to allow the rear section 206 to pivot in a horizontal plane relative to the front section 204, as can best be seen in FIG. 3b. As shown in FIGS. 3a and 3b, the front section 204 of the beam or lever 202 preferably includes two parallel beams, while the rear section 206 is a rectangular-shaped member providing a tongue for the pivot connection 208. The front section 204 includes a tongue 210 for connecting the beam or lever arm 202 to the trailing arm 122 of the suspension system 120 for the tandem axles 110 which support the rear section 106 of the main frame 100. As indicated by the phantom lines in FIGS. 4 and 5 and as more particularly shown in FIG. 6, the tongue 210 of the lever arm 202 extends longitudinally between the wheels 112 and the rear section 106 of the main frame 100.

The rear section 206 of the booster beam or lever arm 202 includes a pair of upwardly projecting connection flanges 220, each including an opening 222 and a pair of downwardly extending flanges 224, each including an opening 226. The secondary frame section 152 is coupled to the booster beam or lever arm 202 by aligning the openings 172, 222, the openings 176, 226, and inserting removable connection pins through the aligned openings. Thus, the secondary frame section 152 can be quickly and easily connected to and disconnected from the arm 202.

The connection means 200 also includes two laterally spaced booster or support pivot arms 230 which extend rearwardly from the rear section 106 of the main frame 100. The two pivot arms 230 are interconnected by a cross beam 232, and each includes a first finger section 234 and a second finger section 236. Each pivot arm 230 also includes an upwardly projecting flange 240 including an opening 242 and a downwardly projecting flange 244 including an opening 246. The pivot arms 230 are connected to the rear section 106 of the main frame by aligning the openings 142 and 146 of the flanges 140 and 144, respectively, of the rear section 106 with the openings 242 and 246 of the flanges 240 and 244, and inserting connection pins through the openings. Thus, the pivot arms 230 can be quickly and easily connected to and disconnected from the rear section 106 of the main frame 100.

The booster or support pivot arm 230 provides a first pivot connection point 250 in proximity to the distal end of the first finger 234 for pivotally connecting the pivot arm 230 to the lever 202 and establishing a fulcrum for pivotal movement of the booster beam or lever arm 202 with the use of a single booster axle 154. A second pivot connection 252 between the pivot arm 230 and lever arm 202 is provided at point 252 in proximity to the distal end of the second finger 236 to establish a second different fulcrum for pivotal movement of the lever arm 202 when two auxiliary or booster axles are used.

The versatility of the booster axle connection system of the present invention can be appreciated by referring to FIGS. 5-8 which show a second auxiliary frame section 152 and booster axle 154 having features identical to the first auxiliary frame section 152 of the booster assembly 150. The second auxiliary frame section 152 is connected to the first auxiliary frame section 152 by aligning openings 182 and 186 of the flanges 180 and 184, respectively, of the first frame section 152 with the openings 172 and 176 of the flanges 170 and 174, respectively, of the second frame section 152 and inserting a connection pin therethrough. By connecting the two auxiliary frame sections 152 to the main frame 100, tandem booster axles 154 are provided. In the preferred embodiment, the longitudinal distance between the tandem axles 154 of the two auxiliary frame sections 152 is 54 inches (137.16 cm). The center between the tandem axles 154 is a distance of 27 inches (68.58 cm) from either axle 154 and is located on a center line 260 which passes through the openings 172, 182, and 176, 186 of the connections between the auxiliary frame sections 152, as best shown in FIG. 5.

It is a well known principle of mechanics that the location of the fulcrum for a lever establishes a relationship for the distribution of weight or forces at the ends of the lever. In particular, this relationship is expressed as $F:W = 1:L$, where 1 represents the shortest distance between the fulcrum and an end of the lever, W represents the weight needed at that end to balance the lever, and L represents the longest distance between the fulcrum point and the other end of the lever, and F represents the force or weight which must be applied to the other end to balance the lever. Thus, the lengths 1 and L are inversely related to the weight or forces W and F, respectively, needed to balance the lever.

The application of this principle of mechanics in the boost axle connection system of the present invention is best shown by referring to FIG. 5. The center for distribution of the weight of the load between the tandem axles 110 supporting the rear of the main frame 100 is represented by a line 262 passing through the pivot point 130 of the suspension system 120. The weight distribution point on a single auxiliary frame section 152 is the axle 154 thereof. The center for distribution of weight between tandem booster axles 154 is the center line 260. In the preferred embodiment, the distance 264 between center lines 260 and 262 for tandem booster axles 154 is 18.083 feet (5.51 meters). The distance 266 between the center line 262 and a vertical line 268 passing through the booster axle 154 of a single auxiliary frame section 152 is 15.83 feet (4.82 meters). Where a single auxiliary or booster axle 154 is added to the main frame 100, there are three axles 110, 154 available for the distribution of the load weight. It is desirable to distribute two-thirds of the load weight on the axles 110, and one-third of the load weight on the booster axle 154. In the preferred embodiment, the distance 270 between the center line 262 and a line 272 passing through the pivot connection 250 is 5.28 feet (1.61 meters). Further, the distance 274 between the line 272 and the line 268 is approximately twice the distance 270, and in the preferred embodiment is approximately 10.56 feet (3.22 meters). Thus, approximately one-third of the load weight which would otherwise be distributed on the axles 110 is shifted to the single booster axle 154. Where tandem booster axles 154 are used, the distance 276 between line 262 and a vertical line 278 extending through the pivot connection 252 is generally equal to the distance 280 between the center line 260 and line 278, and in the preferred embodiment the distances 276 and 280 are approximately 9.04 feet (2.76 meters). Thus, one-half of the load weight which would otherwise be distributed on axles 110 is shifted to the tandem booster axles 154.

Figure 7A:
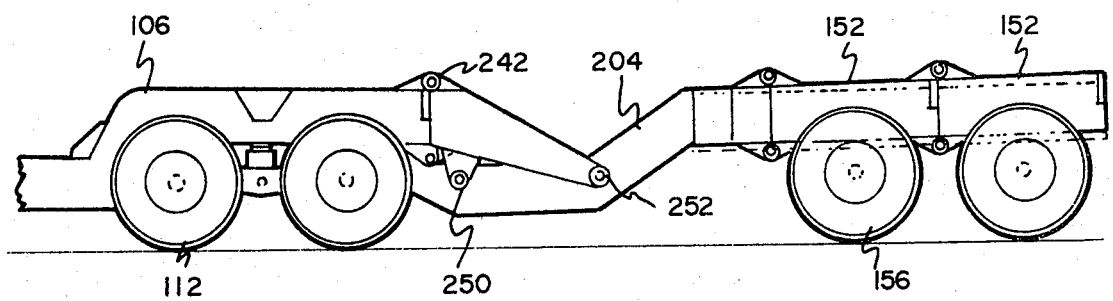
FIGS. 7a and 7b are two diagrammatic illustrations of the trailer assembly shown in FIG. 5 showing different positions of the secondary frame sections.
Figure 7B:
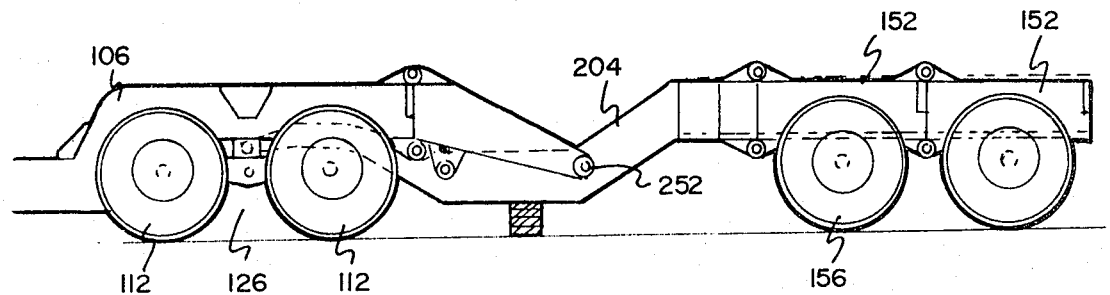

Referring to FIGS. 5, 7a, and 7b, the air bags 166 associated with the independent suspensions 160 for the booster axles 154 may be inflated or deflated to raise (see FIG. 7a) and lower (see FIG. 7b) the auxiliary frame sections 152 to facilitate coupling and uncoupling of the booster beam or lever arm 202 and the booster pivot arm 230 relative to their respective connections to the suspension system 120 and the rear section 106 of the main frame 100.

Referring to FIGS. 9a, 9b, and 9c, a trailer assembly including one or two booster axles 154 connected to the main frame 100 according to the present invention are shown in operation over rough or uneven terrain. The suspension systems 120 and 160 for the tandem axles 110 and tandem booster axles 154, respectively, in conjunction with the variable placement of the fulcrum (pivot points 250 and 252) for the booster beam or lever arm 202 in relationship to the use of either one or two booster axles 154 produce constant loading on the axles 110 and 154 when the trailer assembly is moved over a rough terrain.

Figure 8:
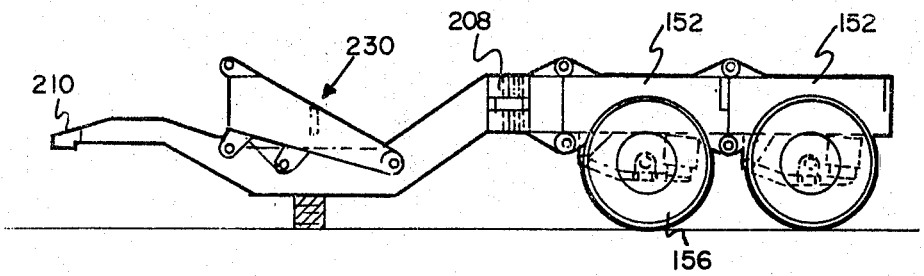
FIG. 8 is a side elevational view of a booster beam, two secondary frame sections supported by booster axles, and a booster support arm detached from the main frame of the trailer assembly shown in FIG. 5.
Figure 10A:
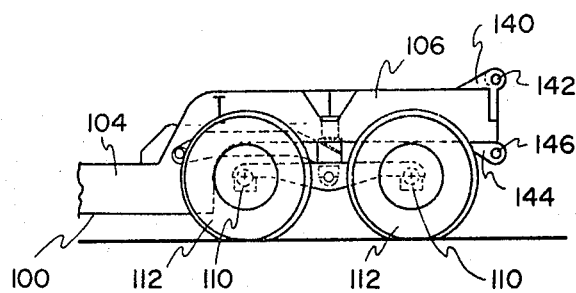
Figure 10B:
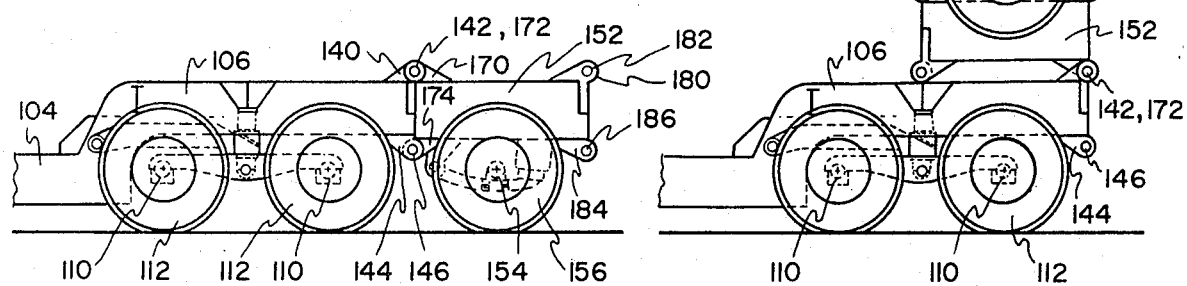
Figure 10C:
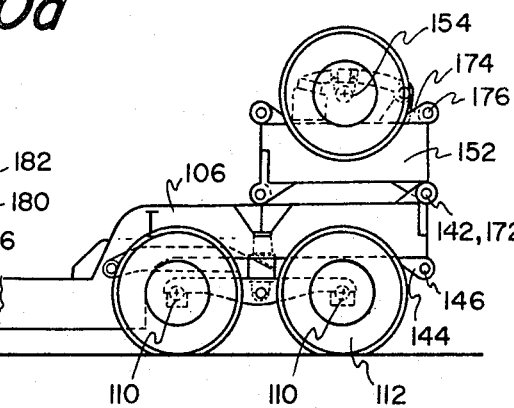
Figure 10D:
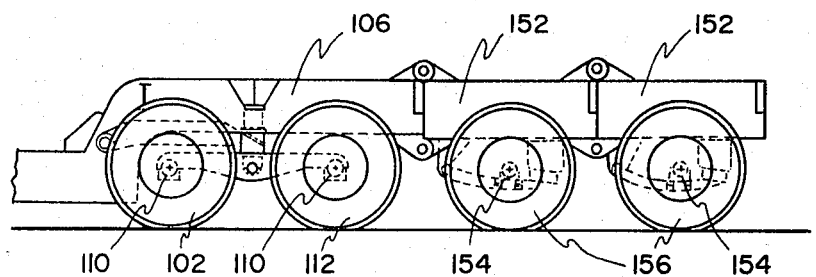
Figure 10E:
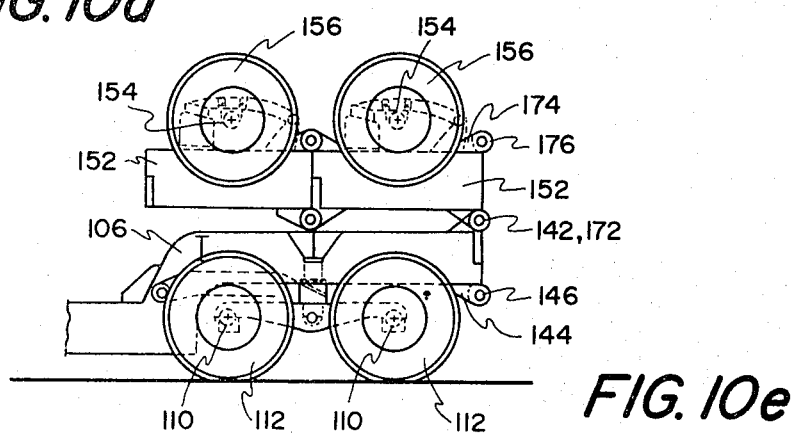

The versatility of the booster axle system can further be appreciated by referring to FIGS. 8, 10a, 10b, 10c, 10d, and 10e. With the booster beam 202 and the booster pivot arm 230 disconnected from the suspension system 120 and rear section 106 of the main frame 100, as shown in FIG. 8, the rear section 106 appears as shown in FIG. 10a. As shown, in FIG. 10b, an auxiliary frame section 152 of the type previously described may be connected directly to the rear section 106 of the main frame 100, thus providing a third axle 154 at the rear of the main frame 100. When the third axle 154 is not needed, the bottom pin in the connection between the rear section 106 and the auxiliary frame section 152 may be removed and the auxiliary frame section 152 pivoted and folded back onto the rear section 106 for carrying purposes, as shown in FIG. 10c. Further, additional auxiliary frame sections 152 may be added to the rear section 106 of the main frame 100, as shown in FIG. 10d. By removing the bottom pin in connection between the rear section 106 and the first auxiliary frame section 152, two or more auxiliary frame sections 152 may be pivoted and folded back onto the rear section 106 for carrying purposes, as shown in FIG. 10e. Although not specifically shown, it can also be appreciated that this same folding technique for auxiliary frame sections would apply where the auxiliary frame sections 152 are connected to the rear sections 106 using the booster axle connection system, i.e., booster lever 202 and booster pivot arm 230 of the present invention. Thus, the present invention provides multiple alternatives for adding auxiliary frame sections 152 and booster axles 154 to the main frame 100 and tandem axial arrangement 110 supporting the main frame 100 of a trailer assembly. Further, auxiliary frame sections 152 may be folded backward onto the rear section 106 of the main frame 100 for carrying purposes so that they do not have to be disconnected when not in use.

What is claimed is:

1. A trailer assembly, comprising a main frame, pairs of laterally spaced wheels on tandem axles supporting the main frame, first suspension means connecting the tandem axles to the main frame, main frame connection means for coupling the main frame to a power unit, a secondary frame, at least one pair of laterally spaced wheels on a booster axle supporting the secondary frame, second suspension means connecting the booster axle to the secondary frame, and a booster axle connection system for coupling the secondary frame to the main frame, the connection system including a lever arm extending forward from the secondary frame, a support arm extending rearward from the main frame, variably positionable fulcrum means for pivotally connecting the support arm to the lever arm at one of at least two fulcrum points.

2. The trailer assembly of claim 1 wherein the connection system further comprises first connection means forward of the fulcrum point for connecting the lever arm to the first suspension means.

3. The trailer assembly of claim 2 wherein the connection system further comprises second connection means for connecting the lever arm to the secondary frame.

4. The trailer assembly of claim 3 wherein the connection system further comprises third connection means for connecting the support arm to the main frame.

5. The trailer assembly of claim 4 wherein the lever arm includes two sections and pivot connection means for pivotally connecting the two sections to allow the sections to pivot horizontally relative to each other.

6. The trailer assembly of claim 1 wherein the position of the fulcrum point is variable in relation to a number N of booster axles connected to the main frame to proportionately distribute load weight between the tandem axles supporting the main frame and the booster axle.

7. The trailer assembly of claim 6 wherein the tandem axles and the booster axle are spaced apart a predetermined distance and the fulcrum point for a single booster axle is positioned on the lever arm at a distance from the booster axle generally equal to two-thirds of the predetermined distance.

8. The trailer assemly of claim 7, comprising a second secondary frame, a second pair of laterally spaced wheels on a second booster axle for supporting the second secondary frame, and fourth connection means for connecting the second secondary frame to the first secondary frame.

9. The trailer assembly of claim 8 wherein the tandem axles supporting the main frame and the booster axles are spaced apart a second predetermined distance and the fulcrum point for two booster axles is positioned on the lever arm at a distance from the two booster axles generally equal to one-half the second predetermined distance.

10. The trailer assembly of claim 9 wherein the second, third, and fourth connection means include means for providing both pivotal and detachable connections.

11. A trailer assembly, comprising a main frame, laterally spaced wheels on two longitudinally spaced-apart main axles supporting the main frame, first suspension means for connecting the two axles to the main frame, the first suspension means including a center of weight distribution on the two main axles, connection means for coupling the main frame to a power unit, an auxiliary frame, laterally spaced wheels on N booster axles supporting the auxiliary frame, second suspension means for connecting the N booster axles to the secondary frame, the second suspension means including a center of weight distribution of the N booster axles, a lever arm extending forward from the auxiliary frame, a support arm extending rearward from the main frame, and a booster axle connection means for pivotally coupling the support arm to the lever arm at one of at least two variably positionable fulcrum points for the lever arm, the centers of weight distribution between the main axles and the N booster axles being spaced apart a predetermined distance, the fulcrum point of the lever arm being variably positioned from the center of weight distribution on the main axles a distance generally equal to $N/N+2$ of the predetermined distance, whereby load weight is proportionately distributed between the main axles and the N booster axles.

12. A booster axle connection system for a trailer assembly having a main frame and tandem main axles supporting the main frame, the connection system comprising at least one booster axle, a booster beam coupled to the booster axle, a booster pivot arm extending from the main frame, the pivot arm including movably positionable fulcrum means for pivotally connecting the pivot arm to the booster beam at one of at least two fulcrum points to proportionately distribute load weight between the main axles and the booster axle.

* * * * *